United States Patent
Landertshamer

(10) Patent No.: US 8,784,969 B2
(45) Date of Patent: Jul. 22, 2014

(54) MESHWORK MADE OF RIBBONS

(76) Inventor: Friedrich Landertshamer, Oftering (AT)

( * ) Notice: Subject to any disclaimer, the term of this patent is extended or adjusted under 35 U.S.C. 154(b) by 383 days.

(21) Appl. No.: 12/998,994

(22) PCT Filed: Dec. 21, 2009

(86) PCT No.: PCT/AT2009/000492
§ 371 (c)(1),
(2), (4) Date: Jun. 22, 2011

(87) PCT Pub. No.: WO2010/081179
PCT Pub. Date: Jul. 22, 2010

(65) Prior Publication Data
US 2011/0256340 A1    Oct. 20, 2011

(30) Foreign Application Priority Data
Jan. 16, 2009  (AT) .................... A 61/2009

(51) Int. Cl.
| | |
|---|---|
| *B32B 5/12* | (2006.01) |
| *B32B 3/00* | (2006.01) |
| *B32B 27/32* | (2006.01) |
| *B32B 5/26* | (2006.01) |
| *B32B 5/08* | (2006.01) |
| *B29C 70/68* | (2006.01) |
| *B29D 28/00* | (2006.01) |

(52) U.S. Cl.
CPC ............... *B29D 28/00* (2013.01); *B32B 27/32* (2013.01); *B32B 5/26* (2013.01); *B32B 5/08* (2013.01); *B29C 70/688* (2013.01); *B32B 5/12* (2013.01)
USPC ............. 428/114; 428/98; 428/105; 428/107; 428/109; 428/110

(58) Field of Classification Search
CPC ........ B29C 70/688; B29D 28/00; B32B 5/08; B32B 5/12
USPC ..................... 428/114, 98, 105, 107, 109, 110
See application file for complete search history.

(56) References Cited

U.S. PATENT DOCUMENTS 6,440,529 B1    8/2002    Baumgart et al.

FOREIGN PATENT DOCUMENTS

| DE | 69 15 557 | 1/1970 |
| DE | 73 42 705 | 4/1974 |
| DE | 41 37 310 | 5/1993 |
| DE | 198 12 475 | 10/1999 |
| EP | 1 739 220 | 1/2007 |
| GB | 2 314 802 | 1/1998 |
| WO | WO 2004/020721 | 3/2004 |

OTHER PUBLICATIONS

International Search Report of PCT/AT2009/000492, Jul. 28, 2010.

*Primary Examiner* — Brent O'Hern
(74) *Attorney, Agent, or Firm* — Collard & Roe, P.C.

(57) ABSTRACT

A meshwork made of ribbons (1, 2) is described which are connected with each other by way of a thermoplastic filler material. In order to provide simple constructional conditions it is proposed that the ribbons (1, 2) which are laid in at least two groups and intersect one another in groups are fixed between two cover layers (3, 4) with respect to their mutual position, which layers have an at least two-layer configuration with a bonding layer which faces the ribbons (1, 2) and is made of a thermoplastic material and with a carrier layer having a higher tensile strength, which layers are connected with each other and with the ribbons (1, 2) by way of the bonding layer.

3 Claims, 1 Drawing Sheet

MESHWORK MADE OF RIBBONS

CROSS REFERENCE TO RELATED APPLICATIONS

This application is the National Stage of PCT/AT2009/000492 filed on Dec. 21, 2009, which claims priority under 35 U.S.C. §119 of Austrian Application No. A 61/2009 filed on Jan. 16, 2009, the disclosure of which is incorporated by reference. The international application under PCT article 21(2) was not published in English.

1. FIELD OF THE INVENTION

The invention relates to a meshwork made of ribbons which are connected with each other by way of a thermoplastic filler material.

2. DESCRIPTION OF THE PRIOR ART

In order to arrange meshworks in form of knitted fabrics in which fringed ribbons are looped around weft ribbons for forming meshes in such a way that they show an extension which is sufficiently low especially for use in packaging machines it is known (WO 2004/020721 A1) to knit an additional ribbon which is made of a thermoplastic material with the weft and/or fringed ribbons, which additional ribbon has a lower melt temperature than the weft and fringed ribbons, so that after hot pressing of the knitted fabric fused and sealed connections occur at all crossing and connecting points and the meshwork is simultaneously smoothed. The disadvantageous aspect is the effort linked to the production of these knitted fabrics. Moreover, thick places caused by the knot points which are necessary for forming the meshes and are caused by looping of the weft ribbons with the fringed ribbons cannot be avoided.

SUMMARY OF THE INVENTION

The invention is therefore based on the object of providing a meshwork of the kind initially described above in such a way that it has a comparatively simple configuration, hardly forms thick places and provides advantageous preconditions for strength properties that also fulfill high demands.

This object is achieved by the invention in such a way that the ribbons which are laid in at least two groups and intersect one another in groups are fixed between two cover layers with respect to their mutual position, which layers have an at least two-layer configuration with a bonding layer which faces the ribbons and is made of a thermoplastic material and with a carrier layer having a higher tensile strength, which layers are connected with each other via the bonding layer and with the ribbons (1, 2).

Since the meshwork does not consist of any knitted or woven fabric but of an interlaid fabric with ribbons crossing one another in groups, simple production conditions are obtained with the advantage that in the crossing regions of the ribbons there are no thick places which impair the handling of the meshwork because the ribbons which are merely positioned flat against one another and which are preferably made of high-density polyethylene can be arranged in a very thin way and can have a thickness of between 10 and 20 µm. The fixing of the mutual position of these ribbons laid in crosses occurs by two cover layers which enclose the ribbons between themselves and which are made of at least two layers and comprise a bonding layer made of a thermoplastic material in addition to the carrier layer of higher tensile strength, which bonding layer ensures a molten connection or hot sealing of the two cover layers as well as the cover layers and the interposed ribbons during hot pressing of the meshwork, so that the ribbons are linked in a non-displaceable manner via thermoplastic filler material to the carrier layer of the cover layers and are fixed in their mutual position by these carrier layers. The thermal treatment of the interlaid fabric for connection of the ribbons with the cover layers further ensures that the meshwork is subjected to only low residual shrinkage or expansion.

The cover layers can be made of co-extruded films for special purposes between which the interlaid meshwork is fixed, which in this case represents a respective reinforcement of the films. When applied to packages, the meshwork character should be maintained, so that the cover layers are made from parallel positional strips extending at a distance from each other, with the positional strips of the two cover layers covering one another and thus crossing the meshes of the meshwork which is formed by the ribbons placed in crosses. The ribbons are therefore fixed in a non-displaceable manner along these positional strips between the cooperating positional strips of the two cover layers. The mutual distance of the positional strips in comparison with the mesh width of the meshed fabric and the width of these positional strips determine the dimensional stability of the meshes of the meshwork.

It is not necessary to stress that it is also possible within the scope of the invention to arrange one cover layer at least partly as a film which cooperates with the positional strips of the opposite cover layer. The relevant aspect is that not only a non-displaceable connection of the ribbons with the cover layers is achieved by way of the cover layers, but also that the ribbons are additionally fixed in their mutual position by means of the carrier layer of the cover layer, which can both be achieved with film-like cover layers as well as positional strips, the width of which is considerably narrower than that of the ribbons.

BRIEF DESCRIPTION OF THE DRAWINGS

The subject matter of the invention is shown in the drawings by way of example, wherein.

DESCRIPTION OF THE PREFERRED EMBODIMENT

Figure 1:
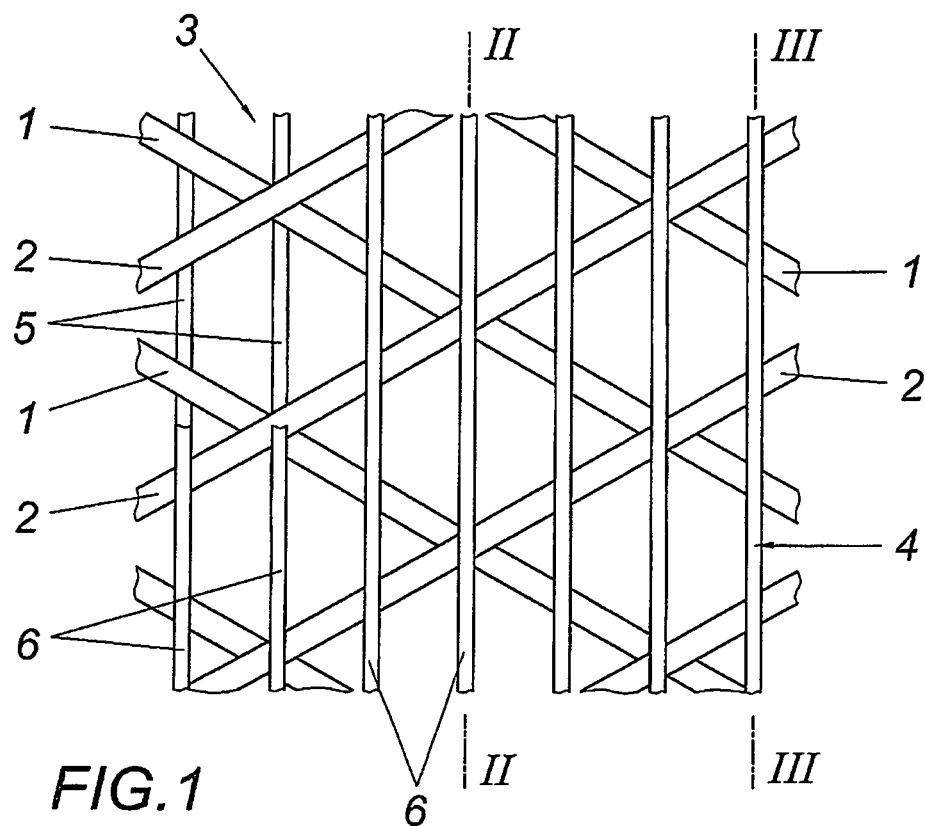
FIG. 1 shows a section of a meshwork in accordance with the invention in a partly exposed schematic top view.
Figures 2, 3:
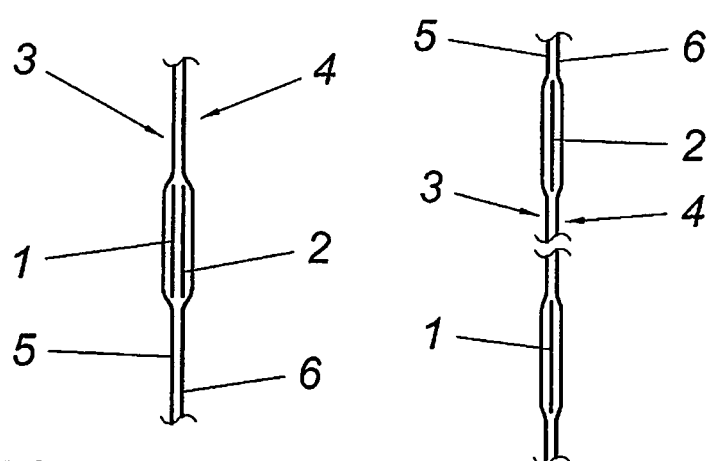
FIG. 2 a schematic sectional view along the line II-II of FIG. 1 on an enlarged scale.
FIG. 3 shows a view of a section corresponding to FIG. 2 along the line III-III of FIG. 1.

The meshwork shown in FIG. 1 represents an interlaid fabric made of two mutually crossing groups of ribbons 1, 2 which are fixed in their mutual position by means of two cover layers 3, 4 in form of mutually spaced, parallel positional strips 5 and 6. As is shown in FIG. 1, the positional strips 5 of the one cover layer 3 which forms the bottom cover layer according to the illustration of FIG. 1 and the positional strips 6 of the other upper cover layer 4 cover one another, so that the ribbons 1, 2 are fixed between the mutually connected positional strips 5, 6 without having to connect the ribbons 1, 2 with one another in the region of their crossing points.

In order to enable the cover layers 3, 4 to fulfill their object concerning the positional fixing of the ribbons 1, 2 which are placed in crosses, these cover layers 3, 4, and the positional strips respectively, are composed of at least two layers, which is a carrier layer with a sufficient tensile strength and a bonding layer on the side of the carrier layer facing the ribbon 1, 2.

This bonding layer consists of a thermoplastic material which ensures a molten or hot sealing connection between the adjacent positional strips 5, 6 of the cover layers 3, 4 and between the positional strips 5, 6 and the adjacent ribbons 1, 2 during hot pressing of the meshed interlaid fabric. The positional strips can therefore comprise a carrier layer made of high-density polyethylene and a bonding layer made of low-density polyethylene. Co-extruded films made of high-density and low-density polyethylene can be cut into strips for this purpose. The ribbons per se must be chosen in such a way that they are capable of absorbing the occurring loads. These strips can therefore also consist of high-density polyethylene, with coating with low-density polyethylene being possible but not required.

After the hot pressing of the meshed interlaid fabric, a meshwork can be obtained which is dimensionally stable, offers only very low residual shrinkage and expansion, and can be welded together both with similar meshworks and with films and the like.

The invention claimed is:

1. A meshwork made of ribbons, wherein the ribbons are laid in at least two groups, intersect one another in the at least two groups, and are fixed between two cover layers with respect to their mutual position, which cover layers have an at least two-layer configuration with a bonding layer which faces the ribbons and is made of a thermoplastic material and with a carrier layer having a higher tensile strength than the bonding layer, which cover layers are directly connected with each other and with the ribbons by way of the bonding layer.

2. A meshwork according to claim 1, wherein at least one cover layer comprises parallel positional strips which extend at a distance from each other.

3. A meshwork according to claim 2, wherein both cover layers comprise parallel positional strips, with the positional strips of the two cover layers covering one another.

* * * * *